(12) United States Patent
Sheiman et al.

(10) Patent No.: US 9,256,925 B2
(45) Date of Patent: Feb. 9, 2016

(54) ANGLE-DEPENDENT DEGHOSTING OF SEISMIC DATA

(71) Applicant: SHELL INTERNATIONALE RESEARCH MAATSCHAPPIJ B.V., The Hague (NL)

(72) Inventors: Jonathan Lewis Sheiman, Houston, TX (US); Ailin Yin, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/375,201

(22) PCT Filed: Jan. 29, 2013

(86) PCT No.: PCT/US2013/023583
§ 371 (c)(1),
(2) Date: Jul. 29, 2014

(87) PCT Pub. No.: WO2013/116195
PCT Pub. Date: Aug. 8, 2013

(65) Prior Publication Data
US 2015/0003689 A1    Jan. 1, 2015

Related U.S. Application Data

(60) Provisional application No. 61/593,090, filed on Jan. 31, 2012.

(51) Int. Cl.
| | |
|---|---|
| G06K 9/00 | (2006.01) |
| G06T 5/00 | (2006.01) |
| G01V 1/38 | (2006.01) |
| G01V 1/36 | (2006.01) |
| G01V 1/30 | (2006.01) |

(Continued)

(52) U.S. Cl.
CPC ............... *G06T 5/003* (2013.01); *G01V 1/308* (2013.01); *G01V 1/345* (2013.01); *G01V 1/364* (2013.01); *G01V 1/38* (2013.01); *G06T 5/50* (2013.01); *G01V 2210/56* (2013.01); *G06T 2207/20201* (2013.01); *G06T 2207/20216* (2013.01)

(58) Field of Classification Search
None
See application file for complete search history.

(56) References Cited

U.S. PATENT DOCUMENTS

| | | | |
|---|---|---|---|
| 5,774,417 A * | 6/1998 | Corrigan | G01V 1/36 367/21 |
| 7,450,468 B2 | 11/2008 | Grygier et al. | |
| 2003/0028326 A1 | 2/2003 | Monk et al. | |

(Continued)

OTHER PUBLICATIONS

PCT International Search Report, Application No. PCT/US2013/023583 dated May 14, 2013.

*Primary Examiner* — Bhavesh Mehta
*Assistant Examiner* — Oneal R Mistry

(57) ABSTRACT

A method for generating a seismic image, comprising the steps of providing an input trace corresponding to seismic signals received at a receiver at a known receiver depth, using the input trace to generate a series of angle traces, each having a known time dip, for each angle trace, determining a filter H, for each angle trace, correcting the data by using the inverse of the filter H to generate a plurality of deghosted angle traces, copying each deghosted angle trace to a plurality of output locations and applying in each case the time dip for that angle trace so as to generate a plurality of corrected angle traces, at each output location summing a plurality of the corrected angle traces at that output location so as to generate a replacement trace; and using the replacement trace, preferably in combination with other replacement traces, to generate a seismic image.

8 Claims, 3 Drawing Sheets

(51) Int. Cl.
*G01V 1/34* (2006.01)
*G06T 5/50* (2006.01)

(56) References Cited

U.S. PATENT DOCUMENTS

| | | | |
|---|---|---|---|
| 2006/0185929 A1* | 8/2006 | Koren | G01V 1/28 181/101 |
| 2006/0193204 A1 | 8/2006 | Davies et al. | |
| 2006/0239117 A1 | 10/2006 | Singh et al. | |
| 2008/0109168 A1* | 5/2008 | Koren | G01V 1/32 702/16 |
| 2011/0176384 A1* | 7/2011 | Soubaras | G01V 1/28 367/21 |
| 2011/0305109 A1 | 12/2011 | Soubaras | |
| 2013/0182532 A1* | 7/2013 | Ferber | G01V 1/364 367/21 |
| 2015/0260868 A1* | 9/2015 | Moldoveanu | G01V 1/3817 367/17 |

* cited by examiner

ANGLE-DEPENDENT DEGHOSTING OF SEISMIC DATA

PRIORITY CLAIM

The present application is a National Stage (§371) application of PCT/US2013/023583, filed Jan. 29, 2013 which claims priority from U.S. Provisional Application 61/593,090, filed Jan. 31, 2012, both of which are hereby incorporated by reference in their entirety.

FIELD OF THE INVENTION

The invention relates to a method for deghosting seismic data acquired by a marine seismic source and receiver assembly, and more particularly to a method in which the effects of seismic reflections by the water surface, or ghosts, are mitigated with a angle-dependent deghosting algorithm.

BACKGROUND OF THE INVENTION

Marine seismic data is typically acquired by hydrophones in a cable or cable array that is towed behind the acquisition vessel and kept several meters below the sea surface. The hydrophones record both waves which travel directly from the earth to the receivers (the "primary" signal) and those same waves after they have been reflected at the sea surface and arrive after a time delay (the "ghost" signal). The ghost signal interferes with the primary signal constructively or destructively, giving a distorted signal. This is particularly true when the source and receiver are relatively close together, as the time delay of the ghost is not sufficient to separate it from the primary signal. Ghosts can occur relative to the source ("source ghosts") and relative to the receiver(s) ("receiver ghosts").

Because ghosts distort the primary signal, they reduce the value of the resulting seismic data. Therefore, it is common to undertake various techniques to reduce the effect of ghosts. Mitigation or elimination of ghosts from the desired data is called "deghosting."

If data are gathered simultaneously using both hydrophones (pressure sensors) and geophones (accelerometers), the difference between the two datasets can be used to deghost the data. If two types of sensors are not available, however, other deghosting techniques must be applied.

Some conventional seismic processing techniques attempt to deghost the data using an assumption that the waves are traveling in a near vertical direction as they approach the instruments. However, waves can and do travel at angles through the water, due to reflector dip and/or shot-receiver offsets. The nature of the distortion varies, and the vertical deghosting procedure doesn't fully remove it. The problem becomes more significant as the depth of the receivers increases. Thus, it is increasingly desirable to provide a deghosting technique that takes into account the propagation angle of the incoming seismic signal.

SUMMARY OF THE INVENTION

In accordance with preferred embodiments of the invention there is provided a deghosting technique that takes into account the propagation angle of the incoming seismic signal.

In one preferred embodiment, at least one input trace corresponding to seismic signals received at a receiver at a known receiver depth is provided. The input trace is used to generate a series of angle traces, each having a known time dip $(p_x, p_y) = (dT/dx, dT/dy)$. Then, for each angle trace, a filter H is determined using $\sin(\theta) = \sqrt{1 - v_w^2(p_x^2 + p_y^2)}$ where $v_w$ is the propagation velocity in water to determine an angle $\theta$ and $H(\omega) = 2i \sin(i\omega z_r \cos(\theta)/v_w)$ where $z_r$ is the receiver depth and $\omega$ is the angular frequency. Each angle trace is then corrected for ghosting by using the inverse of the filter H so as to generate a plurality of deghosted angle traces. Each deghosted angle trace is then copied over to a plurality of output locations, applying in each case the time dip for that angle trace, so as to generate a plurality of corrected angle traces and, for each output location, a plurality of the corrected angle traces at that output location are summed so as to generate a replacement trace. The replacement trace can be used to generate a seismic image. Alternatively, steps a)-g) may be repeated for a plurality of input traces, in which case step g) may comprise, at each output location, summing the replacement traces at that output location so as to generate an output trace and using the generated output traces to generate a seismic image.

The output locations may or may not correspond to the input locations. The number of input traces may or may not be greater than 100. Step b) may or may not include generating at least 30 angle traces from each input trace.

Steps a)-i) may be repeated after a period of time so as to generate a second seismic image and time-spaced seismic images may be compared so as to generate a time-lapse image.

The seismic signals are preferably received at a receiver selected from the group consisting of hydrophones, geophones, fiber optic sensors, ocean bottom sensors, streamers, and combinations thereof and are preferably received at a towed marine receiver.

As used in this specification and claims the following terms shall have the following meanings:

"offset" refers to the horizontal distance from the source-position (or from the center of a source group) to a seismic detector, or more commonly to the center of a detector group measured in the horizontal (x-y) plane. For a vertically staggered source array, the source-position is assumed to be located at a point in the x-y plane directly above the center-point of the stacked elements;

"in-line" refers to a line whose axis lies in the horizontal (x-y) plane and lies parallel to the direction in which the 3D seismic data was acquired;

"primary signal" refers to that portion of the sound energy that propagates from the reflector(s) to the receiver(s) without being reflected off the sea surface; and "ghost" refers to a delayed negative representation of the primary signal that is the reflection of the sound energy by the sea surface.

BRIEF DESCRIPTION OF THE DRAWINGS

For a more detailed understanding of the invention, reference is made to the accompanying Figures wherein.

DETAILED DESCRIPTION OF A PREFERRED EMBODIMENT

Figure 1:
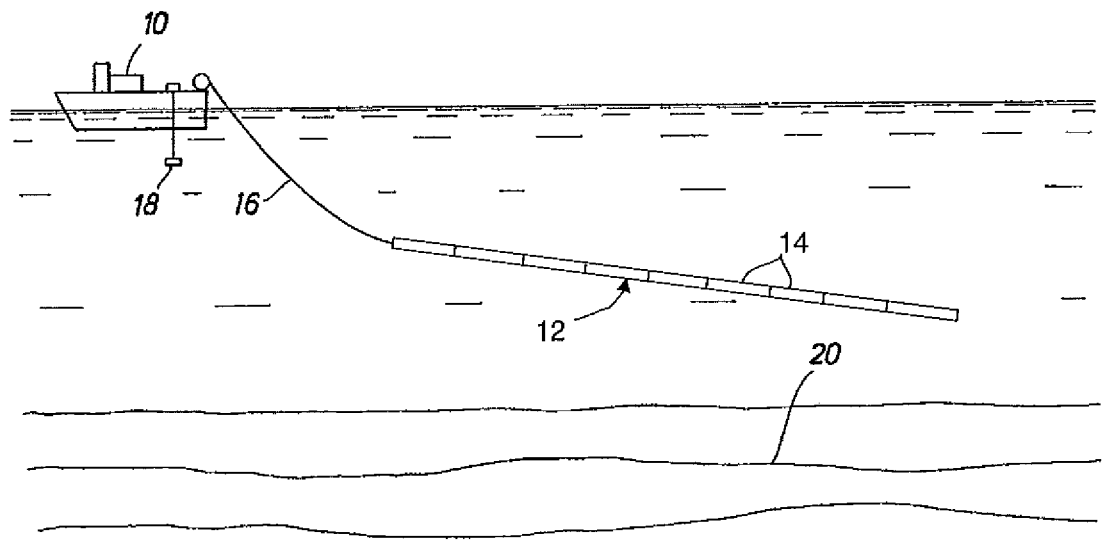
FIG. 1 is a schematic illustration of an exemplary system that could be used to collect marine seismic data for use with the present invention.

Referring initially to FIG. 1, a seismic exploration vessel 10 is shown towing a marine streamer cable 12 through a body of water located above the substrata 20 that are to be seismically explored. Cable 12 can be very long, for example, 2 miles or more, and is normally composed of a number of individual sections 14 connected end to end. The cable can be straight, slanted or curved.

It will be understood that for simplicity of the drawing a 2D system is shown, whereas in real operations, multiple streamers are generally towed behind an acquisition boat to form a 3D system. Typical 3D vessels tow a suite of such cables, which are separated from each other in the cross-line direction, to allow areal sampling of the wavefield.

The forward section of cable 12 is typically connected to vessel 10 by a lead-in section 16. As is known in the art, each section 12 typically contains a number of hydrophones (not shown) that are positioned in each of sections 14 so that they are spaced apart and interspersed. Acoustic wave energy is provided in the vicinity of cable 12 by an air gun 18 or other suitable means. This wave energy travels downwardly through the earth with a portion of it being reflected upwardly at levels where there is a contrast in the acoustic impedance between layers of the strata, for example, at point 20. The hydrophones sense the acoustic pressure waves produced in the water by the upwardly traveling seismic reflections. The propagating wave front also causes movement of the water particles as it passes; the acceleration of the water particles is sensed by the accelerometers.

Figure 2:
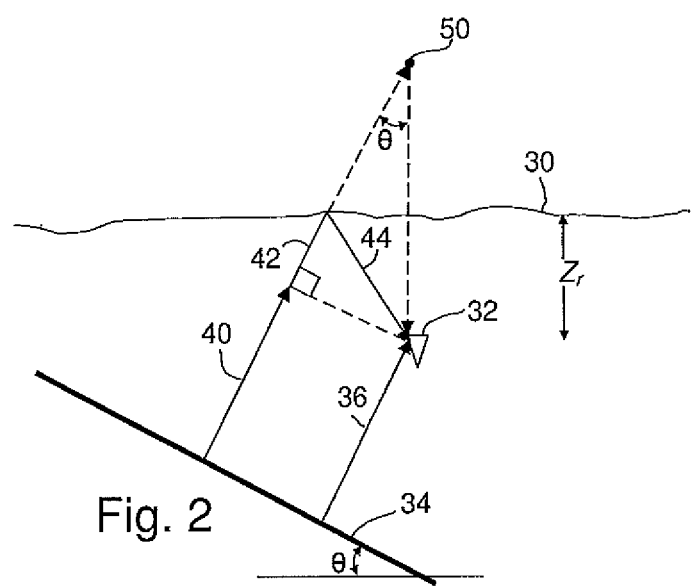
FIG. 2 is a geometric illustration showing the dependency of ghost signals on the angle of propagation.

Referring now to FIG. 2, geometry of the ghosting effect is illustrated. In FIG. 2, a receiver (e.g. a hydrophone) 32 is located a distance $z_r$ below the sea surface 30 and receives a plane wave 34 arriving from below. Wave 34 is travelling at an angle $\theta$ with respect to horizontal. Arrow 36 indicates the primary signal arriving directly at receiver 32. Lines 40, 42, 44, indicate the wave being reflected at the sea surface and traveling down to the receiver, resulting in a ghost signal. An imaginary reflection of the downgoing leg 44 of the ghost signal gives a reflected receiver position 50. From the figure, and using geometry, it can be derived that the signal path for the ghost will be longer than the primary signal path by an amount $\delta L$ given by $$\delta L = 2z_r \cos(\theta) \qquad (1)$$

where $z_r$ is the receiver depth and $\theta$ is the angle of propagation.

The reflection coefficient at the sea surface is close to $-1$, so the net effect of the interference of the primary and ghost signals can be represented by the following filter (in the frequency domain)

$$G(\omega) = 1 - \exp(i\omega\delta L/v_w) = 1 - \exp(2i\omega z_r \cos(\theta)/v_w) \qquad (2)$$

where $v_w$ is the propagation velocity in water and $\omega$ is the angular frequency. As can be seen, the ghosting filter depends on the angle of propagation.

In preferred embodiments, a "re-datuming filter" is also applied, which relates the data which would be measured by ghost-free receiver at sea level to the ghost-free data measured at depth. The combined filter is given by $$H(\omega) = 2i\sin(\omega z_r \cos(\theta)/v_w) \qquad (3)$$

where $i$ is the unit imaginary number.

According to preferred embodiments of the present method data recorded by a single receiver, i.e. a "trace," is replaced with a suite of artificial "replacement traces" at nearby locations, which represent the recorded wavefield.

Figure 3:
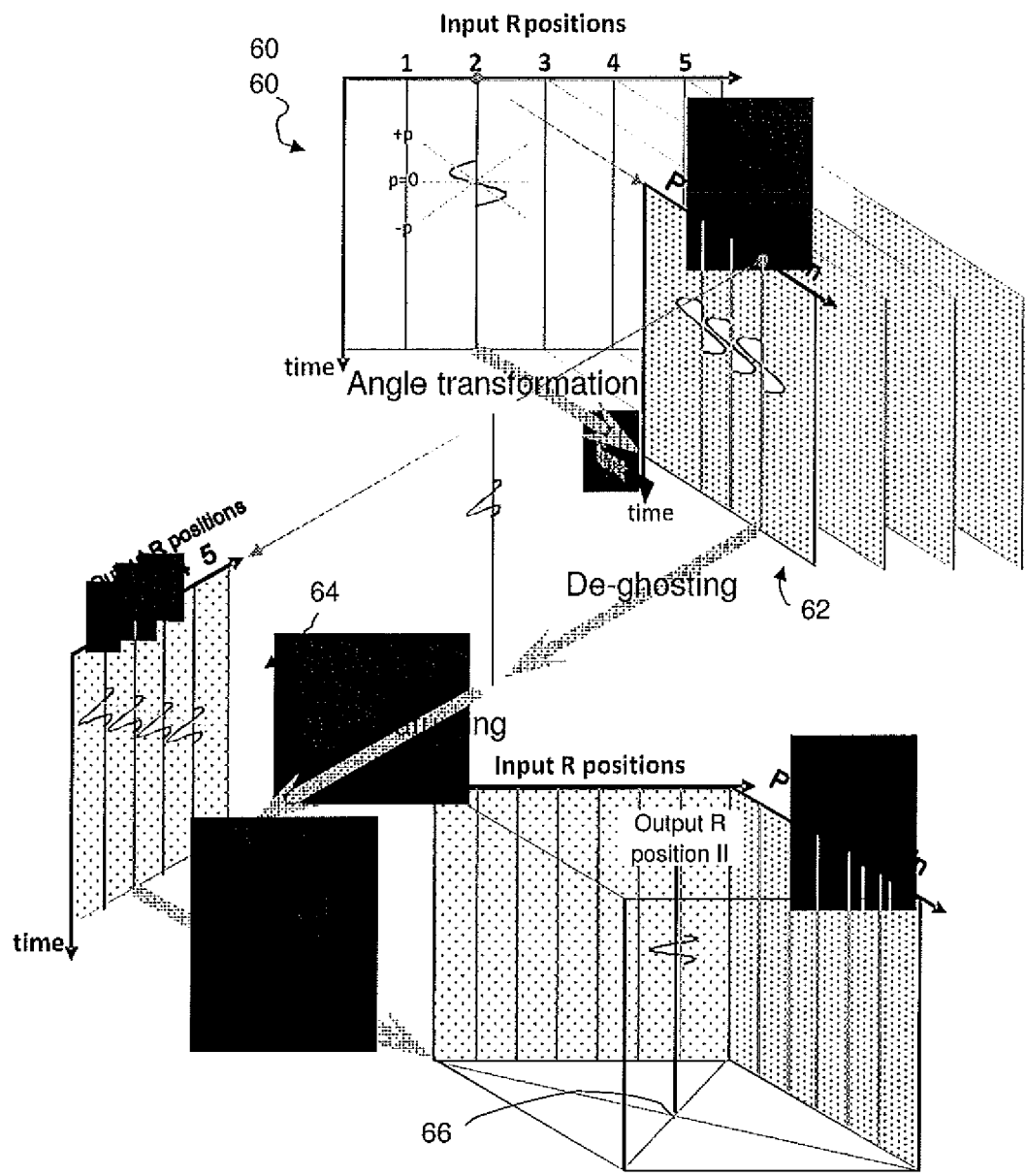
FIG. 3 is a schematic illustration of the concepts of the present invention.
Figure 4:
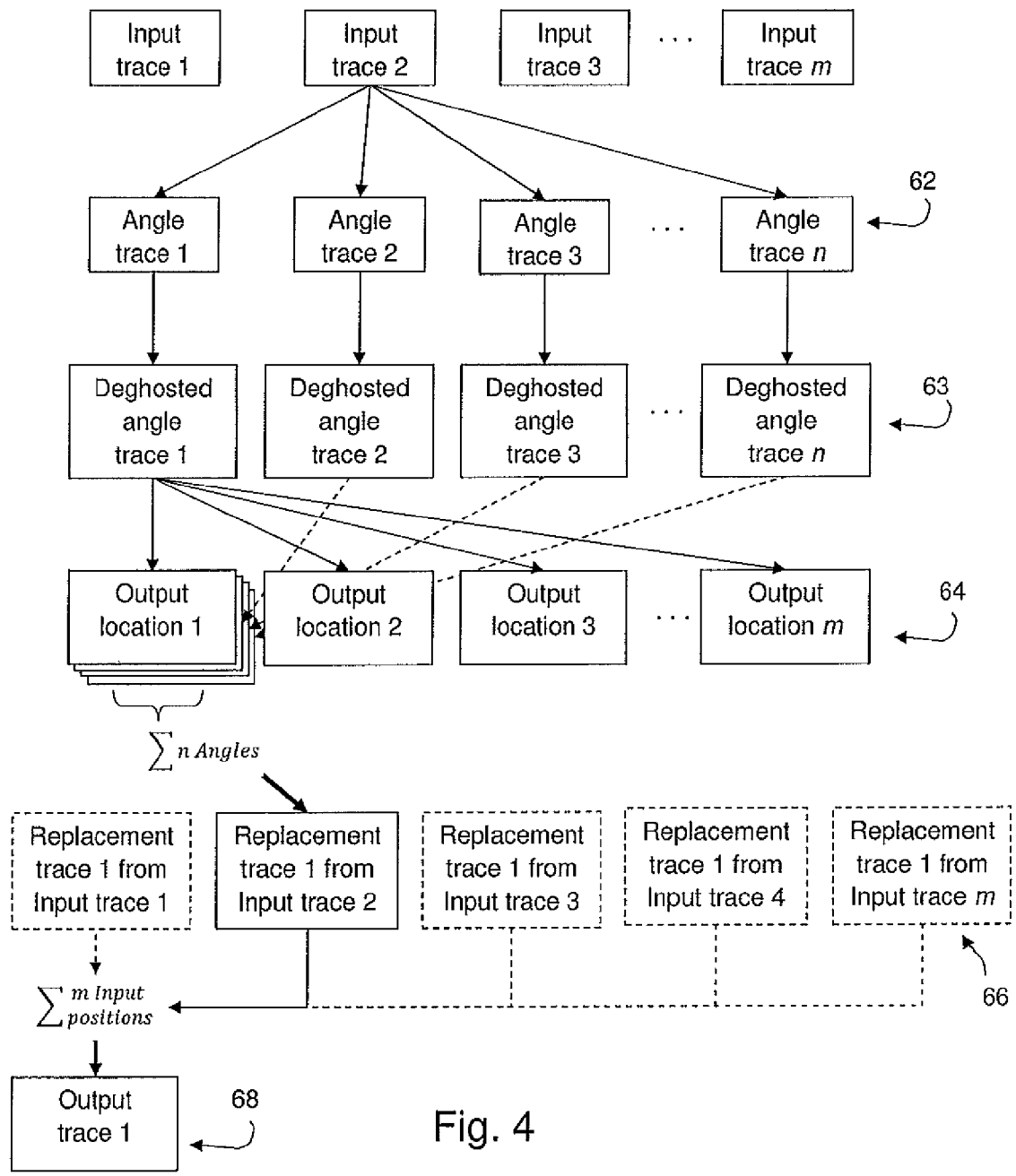
FIG. 4 is a flow chart schematically illustrating one embodiment of the present methods.

One embodiment of the process is illustrated schematically in FIGS. 3 and 4. Starting with the initial data in panel 60, a trace selected as the input trace. By way of example only, in FIGS. 3 and 4, the trace at position 2 is selected as the input trace. The input trace is used to calculate a suite of n angle traces 62, each having with a predetermined time dip $(p_x, p_y)$ = $(dT/dx, dT/dy)$. Each time dip corresponds to a distinct propagation angle $\theta$. In 3D, dips in both horizontal directions are sampled.

$$\sin(\theta) = \sqrt{1 - v_w^2(p_x^2 + p_y^2)} \qquad (4)$$

Because the propagation angle of each dip component is known, its ghosting/re-datuming filter H can be obtained from Equation (3), and a suitably stabilized inverse can be applied to undo the distortion. Thus, each angle trace 62 can be deghosted with an appropriate, specific deghosting filter, yielding a set of n deghosted angle traces 63.

Each dip component (deghosted angle trace) is then "copied" to selected nearby output locations by applying its time dip, as illustrated by the "Output R positions" 64. In 3D, the output locations are preferably areally distributed around the receiver. The output locations may, but do not necessarily, correspond to the input locations. If the number of selected output locations is also equal to m, this step yields a set of m×n corrected angle traces 64.

The corrected angle traces 64 at each output location are added to give m replacement traces 66. Finally, the m replacement traces 66 from all of the input traces are summed, to give a output trace 68 for each output location. Regardless of the propagation angle of the wave, the output traces 68 will have less signal distortion attributable to ghosts than is present in the original input traces.

In summary, the steps of the preferred method are as follows:
a) for each input trace, copy it over to a number of angle traces (the number is preferably determined by sampling theory);
b) correct each angle trace for ghosting by using the inverse of the filter H, using Eq. 4 to determine angle $\theta$ and then Eq. 3 to determine the filter H;
c) "copy" each deghosted angle trace over to nearby output trace locations, applying its time dip;
d) at each output location, accumulate contributions from all of the angle/input-trace combinations.

The method described herein, which can be referred to as "beam deghosting," effectively removes the angle-dependent signal distortion regardless of the propagation angle of the wave. In particular, the present beam deghosting technique provides at least three unique advantages:
1) It does not require that the receivers be regularly distributed in space.
2) It can be applied to acquisition systems in which the depth of the receivers varies or not along the cable. The process is input-oriented, i.e. the depth used in Eqs. 1 and 2 is the depth of the input receiver whose contribution is being calculated, thus the procedure naturally accommodates variable receiver depths.
3) It is fully 3-dimensional, i.e. it accounts for waves whose propagation direction has a horizontal component along the direction orthogonal to the cable, as well as a horizontal component in the direction of the cable.

The combination of re-datuming and de-ghosting ensures that the method can be used in systems in which the depth of the receivers varies along the cable because the replacement traces are referred to a common effective receiver depth (zero) before they are summed.

While the foregoing text describes output traces that are on an (x,y) grid, it will be understood that the input traces can however be at arbitrary locations.

In addition, the present methods can be used as a deghosting method for source ghosts.

As above, the methods may be applied in 2D or 3D, depending on the sampling of the source locations.

The invention has been described herein with respect to preferred embodiments. It will be understood that modifications and variations can be made without departing from the scope of the invention, which is set out in the claims that follow.

The invention claimed is:

1. A method for generating a seismic image, comprising the steps of:
   a) providing at least one input trace corresponding to seismic signals received at a receiver at a known receiver depth;
   b) using the input trace to generate a series of angle traces, each having a known time dip $(p_x, p_y) = (dT/dx, dT/dy)$;
   c) for each angle trace, using
   $$\sin(\theta) = \sqrt{1 - v_w^2(p_x^2 + p_y^2)}$$
   where $v_w$ is the propagation velocity in water to determine an angle $\theta$ and
   $$H(\omega) = 2i\sin(i\omega z_r \cos(\theta)/v_w)$$
   where $z_r$ is the receiver depth and $\omega$ is the angular frequency to determine a filter H;
   d) for each angle trace, correcting the data for ghosting by using the inverse of the filter H so as to generate a plurality of deghosted angle traces;
   e) copying each deghosted angle trace over to a plurality of output locations, applying in each case the time dip for that angle trace, so as to generate a plurality of corrected angle traces;
   f) at each output location, summing a plurality of the corrected angle traces at that output location so as to generate a replacement trace; and
   g) using the replacement trace to generate a seismic image.

2. The method according to claim 1, further including repeating steps a)-g) for a plurality of input traces, wherein step g) comprises
   g1) at each output location, summing the replacement traces at that output location so as to generate an output trace; and
   g2) using the output traces to generate a seismic image.

3. The method according to claim 2 wherein the output locations correspond to the input locations.

4. The method according to claim 2, further including repeating steps a)-i) after a period of time so as to generate a second seismic image and comparing the seismic images so as to generate a time-lapse image.

5. The method according to claim 2 wherein the number of input traces is greater than 100.

6. The method according to claim 1 wherein step b) includes generating at least 30 angle traces from each input trace.

7. The method according to claim 1 wherein the seismic signals are received at a receiver selected from the group consisting of hydrophones, geophones, fiber optic sensors, ocean bottom sensors, streamers, and combinations thereof.

8. The method according to claim 1 wherein the seismic signals are received at a towed marine receiver.

* * * * *